No. 764,595. PATENTED JULY 12, 1904.
H. JONE.
METHOD OF CONVERTING THE ENERGY OF FUEL INTO ELECTRICAL ENERGY.
APPLICATION FILED NOV. 7, 1901.
NO MODEL. 2 SHEETS—SHEET 1.

Witnesses:
Inventor:
Hugo Jone.

No. 764,595. PATENTED JULY 12, 1904.
H. JONE.
METHOD OF CONVERTING THE ENERGY OF FUEL INTO ELECTRICAL ENERGY.
APPLICATION FILED NOV. 7, 1901.
NO MODEL. 2 SHEETS—SHEET 2.

No. 764,595.

Patented July 12, 1904.

UNITED STATES PATENT OFFICE.

HUGO JONE, OF CHICAGO, ILLINOIS.

METHOD OF CONVERTING THE ENERGY OF FUEL INTO ELECTRICAL ENERGY.

SPECIFICATION forming part of Letters Patent No. 764,595, dated July 12, 1904.

Application filed November 7, 1901. Serial No. 81,391. (No model.)

*To all whom it may concern:*

Be it known that I, HUGO JONE, a citizen of the United States, residing in Chicago, in the county of Cook and State of Illinois, have invented a new and useful Improvement in Methods of Converting the Energy of Fuel into Electrical Energy, of which the following is a specification.

This invention relates to methods of converting the energy of fuel into electrical energy.

The object of this invention is to obtain electrical energy from fuel by means of a galvanic cell.

Another object is to obtain a high yield of electrical energy in this manner. Other objects will become apparent hereinafter.

By "fuel" is meant any kind of combustible substance which is capable of reducing the oxid of some such metal as tin to the metal when heated with it, therefore particularly the several kinds of carbon, pure and impure, the carbon compounds which are capable of effecting that reduction, and any gas which may be obtained from solid or liquid fuel by heating it with steam, as in the manufacture of water-gas or with carbon dioxid or some similar substance. In any case the substance from which the electrical energy is generated is either the fuel itself or a substance reduced by the fuel.

In that form of the invention which will be used as an illustration of the invention hereinafter the electric current is generated by the action of caustic potash upon metallic tin, mercuric oxid being used as depolarizer. The cell is heated. Stannite of potassium is obtained in solution, and the stannous oxid contained therein precipitated as stannite of barium by addition of barium hydroxid in watery solution. The stannite of barium is heated with coal or carbon monoxid and the tin reduced in a furnace according to methods similar to those used ordinarily in the reduction of tinstone, except that the hot gases issuing from the furnace are used to heat the cell or a battery of several cells. The reduced tin is again used in the cell for the generation of an electric current. The mercuric oxid is reduced to mercurous oxid by the action of the cell. This mercurous oxid is removed and converted into mercuric nitrate by treatment with concentrated hot nitric acid. The nitrate is broken up by heat, yielding mercuric oxid, which is again used in this cell as depolarizer, and lower oxids of nitrogen, from which nitric acid is recovered by oxidation. The heat of the furnace-gases generated in this process is also used for heating the cells, like that of the gases of the reduction-furnace. The apparatus in which these processes are carried out consists substantially of a battery of galvanic cells, a furnace for the reduction of the stannite, preferably a reverberatory furnace, and a retort suspended within a furnace for the oxidation of mercurous oxid to mercuric oxid connected with a condenser-coil for the recovery of the nitric acid. Both furnaces—the reduction-furnace and that with the retort in which the mercurous oxid is oxidized—discharge their hot gases through a passage-way below the cells, thus heating the cells.

In the accompanying drawings I have shown an illustrative form of the apparatus.

Referring to the drawings and to the various views and reference-signs appearing thereon.

The same reference-sign designates the same part wherever it occurs in the several views.

Figure 1:
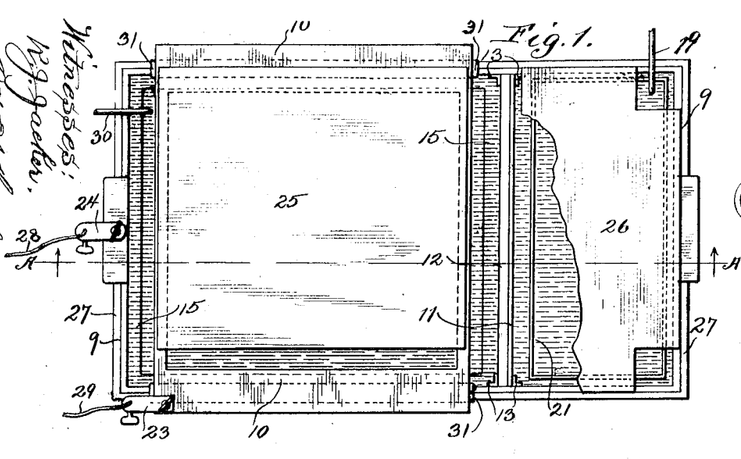
Figure 1 is a top plan view of one of the cells.
Figure 2:
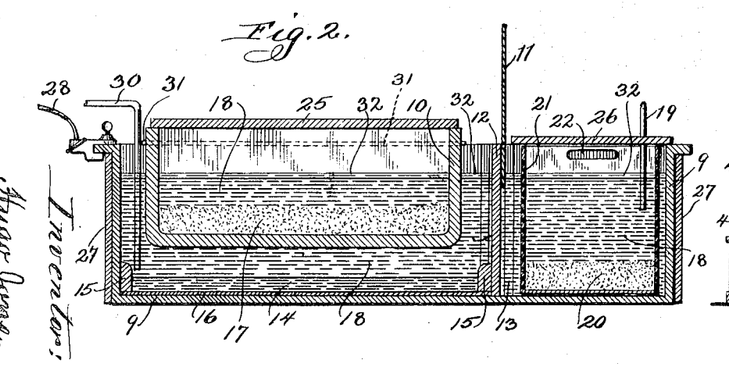
Fig. 2 is a vertical section of the same on line A A of Fig. 1.

The galvanic cells, one of which is shown in Figs. 1 and 2, consist substantially of a vessel 9, preferably square in shape, upon which rests, by means of a flange, a square vessel of porous carbon 10. This vessel, of porous carbon, contains the depolarizer—the mercuric oxid 17—and serves to retain this oxid and the mercurous oxid 17, formed from it by deoxidation, so that they cannot enter the space below, which is the anode-space. At the same time this vessel of porous carbon serves as the negative plate. Vessel 9 is made of some material that is chemically unaffected by caustic potash. Resting upon the bottom of this vessel and in metallic contact therewith is an iron plate 16, provided with a ledge 15, running along its edge and constituting, with the plate, a flat pan. The ledge is made of some material which is chemically unaffected by caustic alkalies, alkaline carbonates, and by molten metallic tin. The flat pan serves as a receptacle for the tin, either solid or molten. The tin constitutes the positive plate, by the oxidation of which the current is generated. The tin is in electric contact with wire 28 through clamp 24, the metal of the vessel 9, and the iron plate 16. The negative plate 10 is in electric contact with wire 29 through clamp 23. Pipe 30 serves to supply the tin to be oxidized in the molten condition. Vessel 9 is larger than either vessel 10 or plate 16, so that a part of vessel 9 remains unoccupied by both vessel 10 and plate 16. This part of vessel 9 is partitioned off by plate 12 and sliding door 11, both of which objects are held in place by angle 13, of suitable material. Plate 12 is made of a porous substance which is not affected by caustic alkalies or alkaline carbonates and which is not apt to cause local action by acting as an electrode. It may be made of sulfid of calcium. In that section of vessel 9 which is thus partitioned off a porous vessel 21 is placed. This vessel is preferably square in shape, so as to fit into the section. It may be provided with handle-holes 22, so that it can be lifted up easily. Pipe 19 serves to supply watery solution of barium hydroxid. The solution is preferably hot and saturated. The powder 20 at the bottom of vessel 21 is stannite of barium, obtained by precipitation of stannite of potassium by the barium hydroxid supplied by pipe 19. The fluid 18, shown in both sections of vessel 9 and in vessel 10, is a concentrated watery solution of caustic potash. This solution is covered by a layer of paraffin 32 to prevent absorption of carbon dioxide and of oxygen from the air. Vessel 9 is protected against loss of much heat by being covered on the sides and on top by thick sheets of asbestos 27 26 25. A strip of electric insulating material 31, such as asbestos or marble, is placed below the flanges of the carbon vessel 10, where it rests on vessel 9. The electric current is obtained between wires 29 and 28. To start the generation of electrical energy, the battery is heated to a temperature somewhat below the boiling-point of the alkali solution. The caustic potash and the mercuric oxid act on the metallic tin, oxidizing it with production of an electric current, the oxygen being supplied by the mercuric oxid, which is thereby reduced to mercurous oxid, or, if there is insufficient supply of it, to metallic mercury, as follows:

$$Sn + KOH + H_2O + 2HgO = SnO + KOH + H_2O + Hg_2O.$$

This reaction may be considered as consisting of the following two reactions if the fact is ignored that the hydrogen is oxidized in the nascent state and not liberated as such if there is proper electrolytic action:

$$Sn + KOH + H_2O = SnO + KOH + 2H$$

$$2H + HgO = H_2O + Hg_2O.$$

In case of insufficient supply of mercuric oxid the last reaction may be modified as follows:

$$2H + HgO = H_2O + Hg.$$

The stannous oxid formed in the battery reaction is gradually dissolved as stannite of potassium, thus:

$$SnO + 2KOH = K_2SnO_2 + H_2O.$$

The stannite of potassium diffuses through the solution and passes through plate 12, the pores of which are wide enough to let it pass readily into the porous vessel 21, the sliding door 11 being raised all the time except immediately before and after the addition of barium-hydroxid solution through pipe 19, when it is closed to prevent the suspended sediment of barium stannite from passing into the anode-space and covering the surface of the tin. In the porous vessel 21 the stannite of potassium is precipitated from time to time, so as to prevent the liquid from becoming saturated with it, the precipitant being a hot concentrated watery solution of barium hydroxid, which is introduced through pipe 19. The reaction is as follows:

$$K_2SnO_2 + Ba(OH)_2 = BaSnO_2 + 2KOH.$$

The barium stannite is allowed to accumulate and is then removed by raising the porous vessel 21 out of the liquid 18 and emptying it. This barium stannite is reserved for reduction to metallic tin, which is then again supplied to the cell for the production of electrical energy.

It will be noticed that the removal of the battery product—the stannous oxid contained in the potassium stannite—prevents the action of the battery from being stopped by saturation of the electrolyte with stannous oxid coupled with accumulation of undissolved stannous oxid on the surface of the metallic tin. Furthermore, the precipitation of the battery product permits of a continued production of electrical energy and of a continued supply of metallic tin for the battery reaction. The tin may be supplied through pipe 30 in the melted condition. The electromotive force of a cell of this kind is 1.03 volts. The current strength of a cell of the described form and of the capacity of one gallon of liquid is twelve amperes when the external resistance is .04 ohm.

Figure 3:
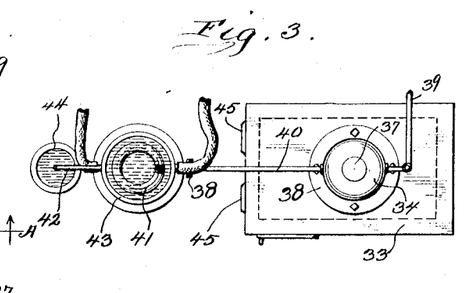
Fig. 3 is a top plan view of the furnace with the retort in which the mercurous oxid is oxidized combined with the condenser-coil for the recovery of the nitric acid.
Figure 4:
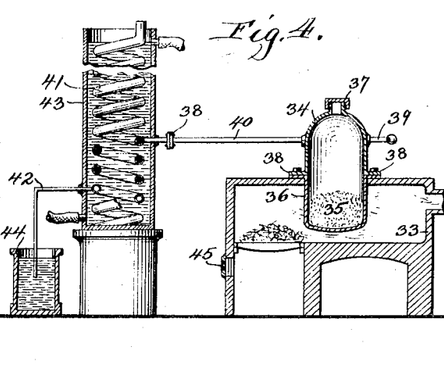
Fig. 4 is a vertical section of the same apparatus, partly in elevation.

The mercurous oxid obtained by the battery-reaction in vessel 10 is allowed to accumulate until nearly the whole of the mercuric oxid is converted into mercurous oxid. Then the mixture of the two oxids is removed by suitable means and a suitable quantity of mercuric oxid put in its place. The apparatus in which mercuric oxid is recovered from the mercurous oxid by oxidation is shown in Figs. 3 and 4. This apparatus comprises a furnace 33, provided with one or two draft-holes in suitable positions 45. Within the furnace is suspended a retort consisting of a lower part 36 and an upper part 34. The lower part 36 is the receptacle for the mixed powders 35. The upper part is provided with a screw-cap 37 and a pipe 39 suitable for the introduction of steam into the retort and provided with a valve and communicates with condenser-coil 41 through pipe 40. The upper part of the retort 34 can be detached by means of flanges 38, so as to afford access to the lower part of the retort 36. Condenser-coil 41 is cooled by cold water contained in condenser 43. Pipe 42 serves to convey any liquid that may form by condensation of vapor in condenser-coil 41 to vessel 44.

The mixture 35 of mercurous and mercuric oxids is placed into the lower part of the retort 36, the upper part 34 having been detached. Concentrated nitric acid is then added to the powder in quantity sufficient to convert it into mercuric nitrate and is mixed with it. Then the upper part of the retort 34 is replaced and connected. A fire is started in the furnace 33 and the retort heated. The mercurous and mercuric oxids are thus converted into mercuric nitrate, the reactions being as follows:

$$Hg_2O + 6HNO_3 = 2Hg(NO_3)_2 + 2NO_2 + 3H_2O$$

$$HgO + 2HNO_3 = Hg(NO_3)_2 + H_2O.$$

If there is reason for suspecting that the quantity of the nitric acid has been reduced so much by evaporation that it is no longer sufficient for the reaction, an additional quantity is added through screw-cap 37. Steam is admitted through pipe 39 and the heating of the retort continued. The heat breaks up the mercuric nitrate as follows:

$$Hg(NO_3)_2 = HgO + 2NO_2 + O.$$

The mercuric oxid is thus obtained as desired. The nitrogen peroxid thus evolved in this and in the second preceding reaction is mixed with the steam, is carried into the condenser-coil 41, mixes there with air entering through the open top of the coil, and is thereby oxidized to nitric acid as follows:

$$3NO_2 + H_2O = N_2O_5 + H_2O + NO =$$
$$2HNO_3 + NO$$
$$NO + O = NO_2.$$

The nitric acid condenses, flows into vessel 44 through pipe 42 and may again be used for oxidation of mercurous oxid to mercuric oxid.

It will noticed that the oxygen for the oxidation of the mercurous oxid is ultimately taken from the air, the nitric acid being recovered.

Figure 5:
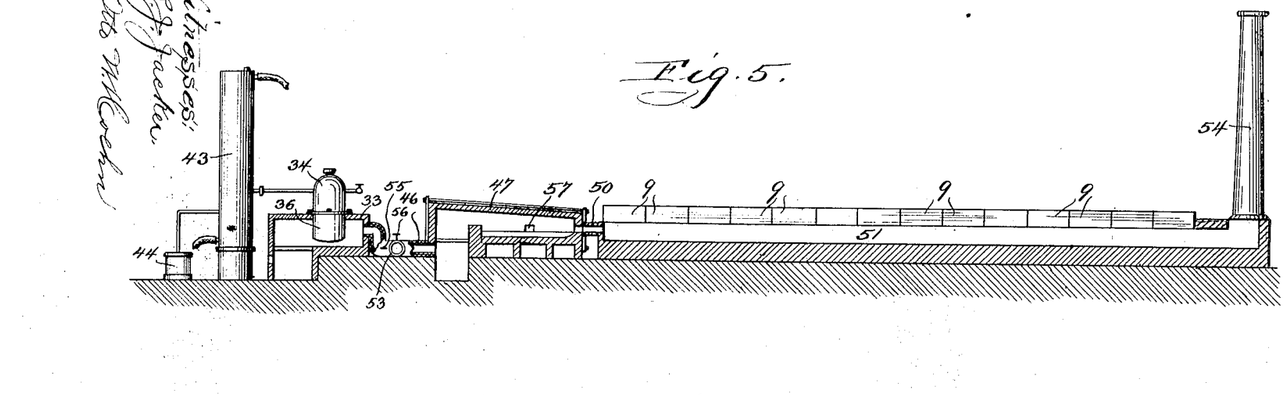
Fig. 5 is a vertical section, partly in elevation, of the entire plan, comprising both furnaces and the battery, with the passage-way for the hot gases below it.
Figure 6:
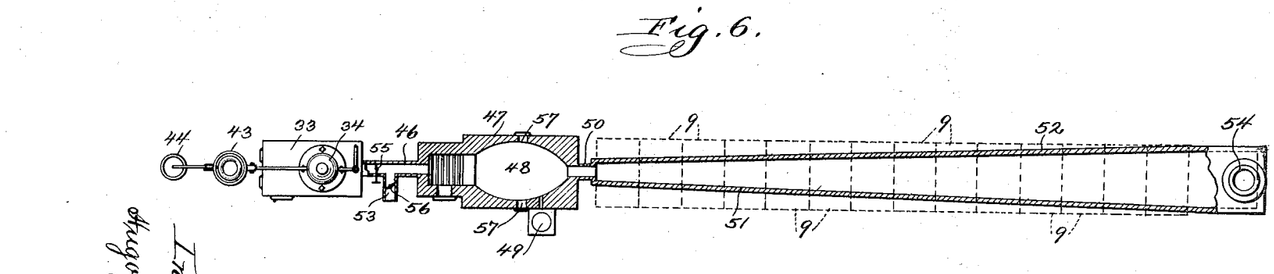
Fig. 6 is a top plan view of the same plan, partly in horizontal section.

An additional advantage is secured in operating cells of the kind described if these cells can be combined with an apparatus for the recovery of mercuric oxid from mercurous oxid. The hot gases issuing from the furnace, the heat of which would otherwise be lost, may be used to keep the cells at an elevated temperature. Furthermore, a furnace is used to reduce the barium stannite which is obtained from the cells, as described hereinabove, to metallic tin, by means of coal or some other suitable fuel, the tin to be used again in the cells for the production of electrical energy. If this furnace is combined in the same plan with the cells, the hot gases of this furnace may also be utilized by applying them to the cells for the purpose of keeping them hot. A plant in which the hot gases of both furnaces are thus utilized is shown in Figs. 5 and 6. For the reduction of the stannite of barium a reverberatory furnace 47 may be used. This furnace does not differ essentially from other reverberatory furnaces used for the reduction of tin ores, except that one of the receptacles for the reduced tin 49 may be omitted and a door substituted for it, so that the charge on the hearth 48 may be worked from both sides through the doors 57 instead of being worked through a door opposite the fire, this latter door 50 being converted into a closed flue in this case. Through this flue 50 the hot gases of the furnace 57, which would otherwise be wasted, pass into the passage-way 51 below the cells 9. The cells, which are separated by sheets of asbestos or other insulating material for electricity and which may be connected in series in the ordinary manner, are thus heated by the gases, which subsequently are discharged into the air through the smoke-stack 54, which causes them to move. The passage-way grows wider where it is nearer the smoke-stack, so as to distribute the heat uniformly by securing a larger surface of contact with the less-hot gases. In the same manner the hot gases from the oxidation-furnace 33 are drawn through the passage-way 51, except that they may be allowed to pass through pipe 46 and the reduction-furnace 47. Pipe 46 is provided with a branch pipe 53, through which air may be supplied to furnace 47 if that coming from furnace 33 along with the hot gases is not sufficient. Both pipes 46 and 53 are covered with asbestos to reduce the loss of heat, and each is provided with a valve 55 and 56, which serve to regulate the draft. As the hot gases coming from furnace 33 contain carbon dioxid, which is reduced to carbon monoxid to some extent when it strikes the hot coal in furnace 47, the arrangement promotes the reduction of the tin compound, since it is the carbon monoxid that reduces it. The reductions of the carbon dioxid by carbon and of barium stannite by carbon monoxid are as follows:

The barium oxid thus obtained is dissolved in hot water and again used for the precipitation of stannous oxid in vessel 21, while the tin is introduced into the cells for further generation of electrical energy, as already stated.

The battery may be operated at a temperature considerably below 300° centigrade. A temperature above 300° centigrade is not indispensable. The temperature may be as low as 150° centigrade. In this case the tin forming the positive plate evidently solidifies. The solid state of the tin, however, does not, or not materially, interfere with the battery reaction. This lowering of temperature is understood to be accompanied by a corresponding lowering of the boiling-point of the alkali solution.

Stannic oxid or stannate of potassium is not formed in the electrolytic oxidation of the tin, or at least to a very limited extent, provided the oxygen of the air is excluded and the cells are kept at a constant elevated temperature. If the cells were allowed to cool, the potassium stannite in solution would be liable to form stannate according to the following reaction:

Thus by keeping out the oxygen of the air and by maintaining a constant elevated temperature the necessity of reducing stannic compounds, which, as is known, would require a higher temperature for reduction than the stannous compound, is obviated.

The apparatus need not be made exactly as described. Changes may be made which do not materially affect the chemical reactions or the production of electrical energy. The number of cells, for instance, or the ratio between the height and the length of the cells, or the shape of the several vessels, may be varied. The apparatus described is merely an illustrative embodiment of the kind of apparatus used.

Caustic soda may be substituted for the caustic potash with slight modification of the temperature of the battery. Tin is by no means the only metal which produces an electric current under the conditions stated. Lead, antimony, and other metals whose oxids are capable of acting as acids toward alkali and which are readily reduced by carbon with formation of carbon dioxid also produce electric currents, with alkali as the electrolyte and mercuric oxid or a similar metallic oxid as the depolarizer. The lead can be recovered as barium plumbite by precipitation with barium hydroxid similar to the tin and the barium plumbite reduced in the same manner as the barium stannite. Cadmium may also be used in place of tin, although its oxid has no acid properties. Barium hydroxid is not the only substance which can be employed for the precipitation of the stannous oxid. Other bases, especially the hydroxids of the other alkali-earth metals, may be used. The barium hydroxid, however, is preferred, because it is more soluble in water, particularly in hot water, so that the addition of much water is avoided.

One of the essential features which distinguishes this invention from old devices I consider to be the combination of an easily-reducible metal, as the positive plate, with an alkaline electrolyte. Those cells with alkaline electrolyte in which zinc is used as the positive plate would answer the purpose of producing electrical energy from fuel, but imperfectly, since the reduction of oxid of zinc in very wasteful. While metallic zinc obtained by reduction from the oxid by means of coal represents only about 2.5 per cent. of the energy of the coal consumed in the reduction, metallic tin obtained from tin-stone by the same process represents about twenty per cent. of the energy of the coal, and still more when it is obtained from freshly-precipitated stannous oxid, the stannous oxid being reduced more readily and at a lower temperature than the stannic oxid and particularly so if it is formed by recent oxidation in presence of water instead of being a hard natural mineral.

As the temperature required for the reduction of the lower oxid of tin is but little more than half as high as the temperature required for that of the higher oxid, taking the temperature of the surroundings as zero, the fall of heat toward the surroundings, and consequently the loss of heat, is only about half as high with the lower oxid. The rapidity with which freshly-formed and finely-divided stannous oxid reacts accounts for a further decrease of the loss of heat, the time required for reduction and during which a high temperature has to be maintained being reduced to about one-half. The great difference in the efficiency of ore reduction and of that of freshly-formed metallic oxids does not seem to have been taken into account hitherto by inventors trying to convert the energy of coal into electrical energy by means of a galvanic cell. The low melting-point of tin evidently also facilitates the reduction.

The difference in the yield in the reduction of zinc and of tin is to a large extent accounted for by the fact that zinc oxid does not form carbon dioxid when heated with carbon, but carbon monoxid, which escapes unused, and, furthermore, by the necessity of maintaining a very high temperature for a considerable time in the reduction of this oxid.

Owing to the difference in the yield, it is, I should think, an important advantage to be able to use for the generation of electrical energy tin or some other easily-reducible metal instead of zinc, particularly so when the advantages of an alkaline electrolyte can be combined with the advantage of an easy reduction. One of the advantages of an alkaline electrolyte is the fact that the metal which is dissolved by it forms an oxid which is more readily reducible than the alkali itself, so that the reduction of the solvent is obviated in the subsequent reduction of the battery product. An example will illustrate this advantage: If metallic zinc is dissolved in sulfuric acid, the regeneration of the metallic zinc from the sulfate of zinc formed by reduction with carbon will, if the common method of reduction is employed, involve the reduction of the acid radical $SO_3$ contained in the sulfate to $SO_2$. This will be doing useless work unless the oxidation energy is utilized besides that of the metallic zinc obtained in the reduction. It is this necessity of utilizing two or more reduction products which is obviated by the employment of an alkaline liquid. If metallic zinc is dissolved in caustic potash, the resulting zincate of potash can evidently be reduced to metallic zinc without a simultaneous reduction of the potassium oxid contained in the zincate. The advantage is secured by the fact that the zinc is dissolved in a solution of the oxid of a metal which, unlike the acid radical $SO_3$, is able to withstand the reducing action of coal or of fuel-gases at a temperature at which the oxid of the zinc is reduced. The advantage, then, which I secure by dissolving tin or any other metal in alkali or in some other oxid which is more stable than the oxid of tin formed in the dissolution is the fact that I have only the oxid of tin to reduce and not the oxid of any other element. Besides, the reduction of barium stannite is equivalent in that respect to that of potassium stannite, since in it the barium is obtained as the oxid and not as the metal or a lower oxid.

Another essential feature of the invention is the presence of water in the electrolyte at an elevated temperature. The presence of water or of some other solvent in the electrolyte makes possible true electrolytic action of a chemical nature, while those currents produced without such a solvent are mostly, if not exclusively, thermocurrents. This seems to be due to the fact that electrolytic dissociation takes place only in solution. I found that certain galvanic cells which do not produce a current without water are capable of producing one upon addition of water to the electrolyte. It is therefore very desirable to retain the water in the electrolyte whenever a cell is heated, since neither a high current strength nor a high yield is to be expected from a current of exclusively thermal origin. Caustic potash is an ideal substance for retaining water in electrolytes, since its avidity for water is great and the boiling-points of its watery solutions exceedingly high. Caustic soda answers the purpose almost but not quite as well, since the boiling-points of its watery solutions of definite concentration are lower than those of potash solutions.

Although it is possible to produce an electric current with certain neutral salt solutions as electrolyte without having anything but the oxid of the dissolved metal to reduce, the current obtained in this manner is much weaker than that obtained with caustic alkali as electrolyte, owing to the corrosive action of the alkali, which makes the battery reaction energetic. The watery solutions of ammonium nitrate and sodium chlorid are capable of acting as electrolytes with tin as the positive plate and mercuric oxid as the depolarizer. The currents produced by these combinations are much weaker than that produced with caustic alkali as the electrolyte. The alkali then secures an energetic reaction. It also secures a more rapid solution of the metallic oxid formed in the battery reaction.

Another circumstance which makes the action of the cell described herein above energetic is the fact that the oxid of tin possesses acid properties in a comparatively high degree, so that its energetic reaction with alkali is accounted for. That metallic tin with hot concentrated alkali generates hydrogen which can be utilized for the production of electrical energy, as in the cell described, is, I should think, attributable to those properties of both substances which are conducive to this effect and not merely to the properties of one of these substances.

An alkaline electrolyte affords considerable convenience and saving of expense in the building and preservation of cells, since the cells may be made of some such cheap durable material as iron, while it is difficult to find a suitable substance which is entirely unaffected by those acids which possess enough avidity for the production of strong electric currents.

Another disadvantage connected with the use of acids and eliminated with that of an alkali is, as is known, the evaporation of the acid and contamination of the air with its vapor, particularly at an elevated temperature.

I also secure by the use of an alkaline electrolyte those advantages which an alkaline electrolyte affords in other cells—for instance, in the Edison-LaLande cell. The internal resistance is comparatively low, although this is partly due to the elevated temperature, since the resistance of electrolytes decreases with the rise of temperature. There is little, if any, of that local action which would result if metals other than tin and soluble in alkali where present and in contact with the tin. The presence of such metals can evidently be easily avoided by using tin free from other metals, and even if any metals should accidentally contaminate the tin those which are not or but slightly soluble in alkali will evidently again be separated from the tin when it dissolves in the alkali. The tin therefore may be said to purify itself to a certain extent. Before any metal can permanently contaminate the tin it must not only be soluble in alkali, but must evidently also be precipitated by barium hydrate, it must have a low melting-point and be reduced by carbon monoxid. Otherwise it will evidently remain in solution when the tin is precipitated or remain solid when the tin melts or remain in the oxidized form when the tin is reduced. The use of an alkali or an alkaline earth evidently helps in effecting the separations of other metals from the tin in at least two instances—namely, in the solution and the precipitation of the metal. This "self-purification of the tin" is undoubtedly responsible to a certain extent for the high efficiency of the cell. I have shown that the use of an alkali as electrolyte besides the elevated temperature affords a strong current, owing to the low internal resistance, and that besides the low melting-point of the tin it causes the self-purification of that metal.

The use of an alkaline electrolyte may in still another manner cause the efficiency to be high, The difference in the efficiencies with alkaline and with acid electrolytes seems to be too great to be accounted for merely by the keeping out of foreign metals.

The only cell which I know to have any essential resemblance with the cell covered by this application is that known as "Borcher's" cell. In this cell, however, no electric current can be produced from carbon monoxid if alkali is substituted for the acid electrolyte, so far at least as I am able to see, for the reason that copper compounds in alkaline solution do not seem to be reducible by carbon monoxid at the ordinary temperature.

The effective or useful combination, then, of an easily-reducible metal with an alkaline electrolyte seems to be new.

It has been asserted that no electric current at all is obtainable from carbon monoxid in Borcher's cell even in acid solution, and this is ascribed to the inefficiency of atmospheric oxygen as depolarizer. It seems, indeed, that free oxygen does not aid in the production of a current, or not much unless it is previously combined with another substance or at least absorbed by some such substance as spongy platinum. It will be noticed that in accordance with these circumstances I combine the oxygen of the air with mercurous oxid for the purpose of depolarization. Besides being an effective depolarizer the mercuric oxid, as well as other metallic oxids which may be used as depolarizers, offers the advantages of remaining undecomposed by the alkali and of being easily regenerated after deoxidation and without the consumption of any substance beyond atmospheric oxygen and fuel. Furthermore, it causes but little waste of energy when acting as a depolarizer. In the Edison-Lalande cell a considerable part of the oxidation energy of the zinc is wasted in breaking up the cupric oxid used as depolarizer. As the energy required to reduce mercuric oxid to mercurous oxid is only about half as much as in the case of cupric oxid for the same amount of oxygen given off, I effect considerable saving of energy by the use of mercuric oxid as described.

To the energetic oxidizing action of the mercuric oxid when acting on metals like tin or antimony I attribute the fact that I obtain as high an electromotive force as 1.03 volts with a comparatively feeble electropositive metal, such as tin, that the battery reaction proceeds rapidly, and that the current strength is comparatively high.

The principal advantage of an elevated temperature is an accelerated battery reaction and an increased current strength owing to the increased tendency of the tin to be oxidized in contact with alkali and to the tendency of the mercuric oxid to give off oxygen at an elevated temperature. By promoting the oxidation of the metal which is but moderately electropositive the elevated temperature makes possible a high yield. In the cold the tin would give but a feeble current, if any at all, and the more strongly electropositive metal would have to be used in order to obtain a strong current. This would necessitate a greater loss of heat in the reduction of the metallic compound formed from the metal, since strongly-electropositive metals require comparatively high temperatures for reduction. It is this loss which is largely avoided by an elevated temperature. At the same time the stannous oxid is dissolved more rapidly, so that the partial or complete stoppage of the current by an accumulation of the oxid on the surface of the tin is prevented and the dissolved stannous oxid can be precipitated more rapidly. These advantages may be secured without cost, since the hot furnace-gases which heat the cells would otherwise be wasted. The special advantage consists in that the cell may be stopped easily by simply lowering the temperature. The stoppage of the current may also be brought about by discontinuing the addition of the barium hydrate. In this case the tin is gradually covered by a film of oxid which retards and finally almost entirely stops the battery reaction. Still another way of stopping this cell is by discontinuing the supply of tin.

The use of tin as the positive plate offers several advantages. Although there are several other easily-reducible metals which are capable of acting as an acid toward alkali—for instance, lead, antimony, and arsenic—and which therefore react with alkali, the use of which as electrolyte is very desirable for its many advantages, the tin excels in rapid reaction with alkali and affords convenience in that it can be supplied to the battery in the liquid state, its melting-point being low. The fact that its reaction with hot alkali is accompanied by formation of hydrogen seems to account largely for the strong electric current it produces in the cell. I believe, indeed, that a large part of the current is due to the electrolytic oxidation of the nascent hydrogen. Considering, furthermore, the fact that tin reduces mercuric oxid under water, even in the cold and without the presence of alkali, it is not surprising that the electrolytic oxidation of tin by mercuric oxid in this cell is violent. This reaction, as well as the formation of hydrogen, is evidently not the only manifestation of the strong affinity of tin for oxygen. The violent oxidation of tin by nitric acid evidently also proves that affinity to be a strong one. It is not surprising that such a strong reducer makes a good positive plate in a galvanic cell, and it is fortunate that the tin can yet be reduced from its oxygen compounds with comparative ease in spite of its strong affinity for oxygen. Furthermore, it is capable of producing a comparatively high electromotive force when used as the positive plate, as is indicated by its position in the electric tension series of metals, in spite of the fact that it is but a feebly basic and easily reducible metal. The difference of the temperatures at which tin decomposes water and at which its oxid is reduced to the metal is not as great as with most other metals. This is another reason why tin is preferred. If some such metal as zinc were to be reduced, the reduction plant would evidently have to be at a very high temperature, while the battery would not need to be heated at all. The hot furnace gases would be useless, and the high temperature of the reduction plant would naturally cause considerable loss of heat, while in the case of tin the battery and the reduction plant may be kept at approximately the same temperature.

By precipitating the tin it is possible to obtain a comparatively strong current, because the solution is not allowed to become saturated with the tin. Such a saturation would reduce the tendency of the tin to be oxidized, and therefore would also reduce the rate of production of electrical energy.

The carbon cathode is an important means for the production of a strong current. It gives a much stronger current than most metals used as cathode. This I attribute largely to the position of carbon in the electrical tension series of metals, which makes it possible to obtain a comparatively high electromotive force even with those metals which are but feebly electropositive, as the positive plate. How important an advantage this is will be more readily understood if it is considered that it is just the feebly electopositive metals which afford a high yield in the reduction by carbonaceous fuel.

What I claim as new and useful, and desire to secure by Letters Patent, is as follows:

1. The method of generating electrical energy which consists in first combining a metal, the oxid of which yields chiefly carbon dioxid in addition to the metal in its reduction by carbon, as the positive plate with an alkali as the electrolyte in a galvanic cell, generating electrical energy by oxidation of the metal, and then reducing that battery product which contains the metal oxidized in the battery reaction, to the metal by means of the oxidation energy of fuel, and repeating the oxidation of the metal with generation of electrical energy, as and for the purpose set forth.

2. The method of generating electrical energy which consists in first combining a metal, the oxid of which yields chiefly carbon dioxid in addition to the metal in its reduction by carbon, as the positive plate with a solution of an alkali as the electrolyte in a galvanic cell, generating electrical energy by oxidation of the metal, and then reducing that battery product which contains the metal oxidized in the battery reaction, to the metal by means of the oxidation energy of fuel, and repeating the oxidation of the metal with generation of electrical energy, as and for the purpose set forth.

3. The method of generating electrical energy which consists in first combining a metal, the oxid of which yields chiefly carbon dioxid in addition to the metal in its reduction with carbon, as the positive plate with an alkali as the electrolyte, and carbon, as the negative plate, in a galvanic cell, generating electrical energy by oxidation of the metal, and then reducing that battery product which contains the metal oxidized in the battery reaction, to the metal by means of the oxidation energy of fuel, and repeating the oxidation of the metal with generation of electrical energy, as and for the purpose set forth.

4. The method of generating electrical energy which consists in first combining a metal the oxid of which yields chiefly carbon dioxid in addition to the metal in its reduction with carbon, as the positive plate with an alkali as the electrolyte and a porous carbon vessel as the negative plate, serving at the same time as a receptacle for the depolarizer, in a galvanic cell, generating electrical energy by oxidation of the metal, and then reducing that battery product which contains the metal oxidized in the battery reaction, to the metal by means of the oxidation energy of fuel, and repeating the oxidation of the metal with generation of electrical energy, as and for the purpose set forth.

5. The method of generating electrical energy which consists in first combining a metal the oxid of which yields chiefly carbon dioxid in addition to the metal in its reduction by carbon, as the positive plate with an alkali as the electrolyte in a galvanic cell, generating electrical energy by oxidation of the metal at an elevated temperature and then reducing that battery product which contains the metal oxidized in the battery reaction to the metal by means of the oxidation energy of fuel, and repeating the oxidation of the metal with generation of electrical energy, as and for the purpose set forth.

6. The method of generating electrical energy which consists in first combining a metal, the oxid of which yields chiefly carbon dioxid in addition to the metal in its reduction by carbon, as the positive plate with an alkali as the electrolyte in a galvanic cell, generating electrical energy by oxidation of the metal, and then reducing that battery product which contains the metal oxidized in the battery reaction and which is in a finely-divided state to the metal by means of the oxidation energy of fuel, and repeating the oxidation of the metal with generation of electrical energy, as and for the purpose set forth.

7. The method of generating electrical energy which consists in first combining a metal, the oxid of which yields chiefly carbon dioxid in addition to the metal in its reduction by carbon, and which is capable of generating hydrogen with that solution of alkali as the positive plate with an alkali as the electrolyte in a galvanic cell, generating electrical energy by oxidation of the metal, and then reducing that battery product which contains the metal oxidized in the battery reaction, to the metal by means of the oxidation energy of fuel, and repeating the oxidation of the metal with generation of electrical energy, as and for the purpose set forth.

8. The method of generating electrical energy which consists in first combining a metal, the oxid of which yields chiefly carbon dioxid in addition to the metal in its reduction by carbon, and which is capable of forming a higher and a lower oxid, as the positive plate with an alkali as the electrolyte in a galvanic cell, generating electrical energy by oxidation of the metal and with formation of the compound in which the metal has the lower valence, and then reducing that battery product which contains the metal oxidized in the battery reaction to the metal by means of the oxidation energy of fuel, and repeating the oxidation of the metal with generation of electrical energy, as and for the purpose set forth.

9. The method of generating electrical energy which consists in first combining a metal, the oxid of which yields chiefly carbon dioxid in addition to the metal in its reduction by carbon, as the positive plate with an alkali as the electrolyte in a galvanic cell, generating electrical energy by oxidation of the metal, and then reducing that battery product which contains the metal oxidized in the battery reaction to the metal by means of carbonaceous fuel as reducing agent, and repeating the oxidation of the metal with generation of electrical energy, as and for the purpose set forth.

10. The method of generating electrical energy which consists in first combining a metal, the oxid of which yields chiefly carbon dioxid in addition to the metal in its reduction by carbon, and is capable of acting as an acid toward alkali as the positive plate with an alkali as the electrolyte in a galvanic cell, generating electrical energy by oxidation of the metal and then reducing that battery product which contains the metal oxidized in the battery reaction, to the metal by means of the oxidation energy of carbonaceous fuel, and repeating the oxidation of the metal with generation of electrical energy, as and for the purpose set forth.

11. The method of generating electrical energy which consists in first combining metallic tin as the positive plate, with an alkali as the electrolyte in a galvanic cell, generating electrical energy by oxidation of the tin, and then reducing that battery product which contains the tin oxidized in the battery reaction to metallic tin by means of the oxidation energy of carbonaceous fuel, and repeating the oxidation of the tin with generation of electrical energy, as and for the purpose set forth.

12. The method of generating electrical energy which consists in first combining a metal, the oxid of which yields chiefly carbon dioxid in addition to the metal in its reduction by carbon, as the positive plate with an alkali as the electrolyte and a compound containing oxygen and capable of deoxidation as the depolarizer in a galvanic cell, generating electrical energy by oxidation of the metal, and the deoxidation of the compound containing oxygen, and then reducing that battery product which contains the metal oxidized in the battery reaction, to the metal by means of the oxidation energy of carbonaceous fuel, and repeating the oxidation of the metal with the generation of electrical energy, as and for the purpose set forth.

13. The method of generating electrical energy which consists in first combining a metal, the oxid of which yields chiefly carbon dioxid in addition to the metal in its reduction by carbon, as the positive plate with an alkali as the electrolyte and a metallic oxid as the depolarizer in a galvanic cell, generating electrical energy by oxidation of the metal and with deoxidation of the metallic oxid, and then reducing that battery product which contains the metal oxidized in the battery reaction, to the metal by means of the oxidation energy of carbonaceous fuel, and repeating the oxidation of the metal with generation of electrical energy, as and for the purpose set forth.

14. The method of generating electrical energy which consists in first combining metallic tin as the positive plate, with an alkali as the electrolyte in a galvanic cell, generating electrical energy by oxidation of the tin, precipitating the tin oxidized in the battery reaction and dissolved in the alkaline liquid by addition of the hydroxid of an alkaline earth with formation of the stannite of that alkaline earth, and then reducing the stannite thus obtained to metallic tin by means of the oxidation energy of carbonaceous fuel, and repeating the oxidation of the tin with generation of electrical energy, as and for the purpose set forth.

15. The method of generating electrical energy which consists in first combining metallic tin as the positive plate with an alkali as the electrolyte in a galvanic cell, generating electrical energy by oxidation of the tin, precipitating the tin oxidized in the battery reaction and dissolved in the alkaline liquid, by addition of the hydroxid of barium with formation of the stannite of barium, and then reducing the stannite thus obtained to metallic tin by means of the oxidation energy of carbonaceous fuel, and repeating the oxidation of the tin with generation of electrical energy, as and for the purpose set forth.

16. The method of generating electrical energy which consists in first combining a metal, the oxid of which yields chiefly carbon dioxid in addition to the metal in its reduction by carbon, as the positive plate with an alkali as the electrolyte in a galvanic cell, generating electrical energy by oxidation of the metal, and then reducing that battery product which contains the metal oxidized in the battery reaction to the metal by means of the oxidation energy of carbonaceous fuel in a furnace, heating the galvanic cell by applying the waste gases of the furnace to it, and repeating the oxidation of the metal with generation of electrical energy, as and for the purpose set forth.

HUGO JONE.

Witnesses:
R. J. JACKU,
EVA B. JUDD.